No. 670,722. Patented Mar. 26, 1901.
J. McKEE.
GATE.
(Application filed Sept. 19, 1900.)
(No Model.)
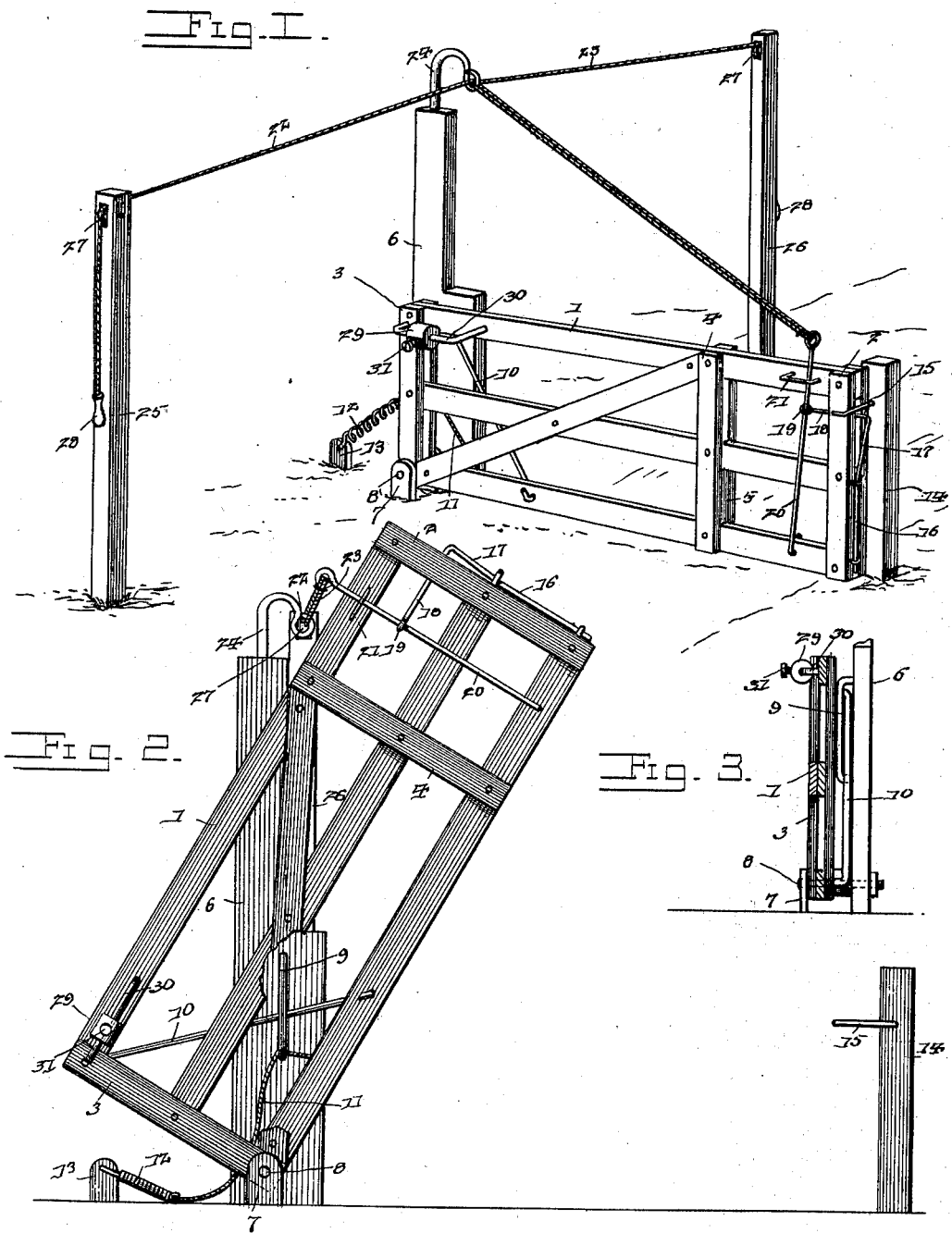
Witnesses
F. E. Alden
H. J. Shepard
J. McKee Inventor
by C. A. Snow & Co.
Attorneys

UNITED STATES PATENT OFFICE.

JAMES McKEE, OF NEW SALEM, INDIANA.

GATE.

SPECIFICATION forming part of Letters Patent No. 670,722, dated March 26, 1901.

Application filed September 19, 1900. Serial No. 30,481. (No model.)

*To all whom it may concern:*

Be it known that I, JAMES McKEE, a citizen of the United States, residing at New Salem, in the county of Rush and State of Indiana, have invented a new and useful Gate, of which the following is a specification.

This invention relates to gates, and has for its object to provide an improved tilting gate and to arrange for the convenient opening and closing of the same. It is furthermore designed to provide improved means for mounting the gate so as to facilitate the tilting thereof and to brace the same against lateral strain and finally to arrange for balancing the gate in its open position.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a gate in its closed position and constructed and arranged in accordance with the present invention. Fig. 2 is a side elevation thereof in its open or elevated position, parts being broken away to show the means for bracing the gate. Fig. 3 is a transverse sectional view of the gate in its closed position and looking toward the hinged end thereof.

Corresponding parts are designated by like characters of reference in all the figures of the drawings.

Referring to the drawings, 1 designates an ordinary farm-gate formed of longitudinal bars, which are connected by the respective end and intermediate cross-bars 2, 3, and 4. Each cross-bar is preferably formed in two parts, which embrace the longitudinal bars, so that suitable weights 5 may be placed between the parts of the intermediate cross-bar and the latch-bar at the free end of the gate.

The hinge gate-post 6 rises above the gate and is located adjacent to one side thereof, while a short stub-post 7 rises from the ground and at the opposite side of the gate, the latter being hinged between the two posts by means of a transverse pivot pin or pintle 8, which is located at the lower corner of the gate, so that the latter may be tilted upwardly and swung to one side of the road, as indicated in Fig. 2 of the drawings.

To brace the gate against lateral strain, a vertical and substantially U-shaped link or loop 9 is carried by the inner side of the post 6, and the gate is provided with a diagonal brace and guide rod 10, which has its opposite ends bent at substantially right angles thereto and secured to the inner side of the gate, so that the rod is offset slightly from the gate. This rod extends from the upper inner corner of the gate downwardly and forwardly to the bottom bar thereof and is slidably received within the link or loop 9, so as to travel through the latter during the tilting of the gate, and thereby prevent lateral play of the latter. A cable 11 has one end connected to the bottom bar of the gate and in rear of the rod 10 and passes rearwardly through the loop or link 9 and beyond the rear end of the gate, where it is connected to a coiled spring 12, which has its opposite end connected to a stub-post 13, driven in the ground at a suitable distance in rear of the gate and in the plane thereof. The purpose of this spring is to aid in elevating the gate and to cushion the latter when it is dropped into its closed position. The opposite free end of the gate closes against a latch-post 14, which is located in the same plane with the hinge-post 6. A fixed keeper 15 extends laterally outward from the latch-post, so as to project across the end of the gate in its closed position and has its outer end bent laterally toward the hinge-post, so as to form a substantially L-shaped keeper to embrace the free end of the gate. A vertically-disposed spring latch-bar 16 has its lower end secured to the bottom of the free edge of the gate, its upper portion being inclined outwardly, as at 17, and then bent laterally inward through the end post to form an arm 18, the bend forming a catch-head, which engages beneath the keeper to lock the gate, as best indicated in Fig. 1 of the drawings. The extremity of the arm is provided with an eye 19, which loosely receives an upright trip-lever 20, which has its lower end fulcrumed upon one of the bars of the gate and its upper end projecting upwardly through a U-shaped guide 21, provided upon the side of the gate.

For the convenient manipulation of the latch-bar two operating-cables 22 and 23 have their corresponding ends connected to the upper end of the trip-lever, with their intermediate portions passing loosely in opposite directions through a suitable guide 24, carried by the upper end of the hinge-post. Suitable posts 25 and 26 are provided at opposite sides of the gate-post 6 and are provided with pulleys or guides 27 for the reception of the end portions of the operating-cables, the latter being provided with suitable terminal handles 28, whereby the cables may be pulled to swing the trip-lever, thereby drawing the head of the catch-bar inwardly and from beneath the keeper, while a continued pull upon either of the cables will result in a tilting upwardly of the gate upon its hinge-pintle 8.

To balance the gate in its elevated position, an adjustable balancing-weight 29 is located at the inner end thereof and at the top of the gate, said weight being slidably mounted upon a laterally-offset rod 30, carried by the upper bar of the gate and extending longitudinally thereof, and a suitable set-screw 31 is provided upon the weight, so as to bind against the rod, and thereby adjustably hold the weight at any position upon the rod. By means of this weight and the weight at the free end of the gate the latter may be effectively balanced in its elevated and open position.

Besides cushioning the gate in its downward movement the spring 12 is designed to tilt the gate upward after the latch has been disengaged from the keeper and to move the gate until the counterbalancing-weight passes the vertical plane of the pivotal support of the gate, when the weight will complete the opening of the gate.

What is claimed is—

1. The combination with a gate-post, and a vertically-tilting gate hinged or pivoted thereto, of a guide-loop carried by the post, a cable connected to the gate and passing rearwardly and loosely through the guide, a coiled spring connected to the rear end of the cable, and a stub-post to which the spring is fixed.

2. The combination with opposite posts, of a vertically-tilting gate pivoted or hinged at its inner lower corner to one side of one of the posts, a guide-loop upon the hinge-post, a diagonal brace-rod carried by the gate and passing loosely through the guide-loop, a cable connected to the gate and passing rearwardly and loosely through the guide-loop, a coiled spring connected to the rear end of the cable, a stub-post to which the spring is connected, a spring-latch at the free end of the gate, a keeper upon the adjacent post and an operating device connected to the latch.

In testimony that I claim the foregoing as my own I have hereto affixed my signature in the presence of two witnesses.

JAMES McKEE.

Witnesses:
   JOHN A. TITSWORTH,
   CHAS. H. McKEE.